US011350489B2

(12) United States Patent
Luo et al.

(10) Patent No.: US 11,350,489 B2
(45) Date of Patent: May 31, 2022

(54) INDICATION OF A PCI CHANGE IN A MOBILE IAB NETWORK

(71) Applicant: QUALCOMM Incorporated, San Diego, CA (US)

(72) Inventors: Jianghong Luo, Skillman, NJ (US); Junyi Li, Chester, NJ (US); Karl Georg Hampel, Hoboken, NJ (US); Navid Abedini, Somerset, NJ (US); Luca Blessent, Whitehouse Station, NJ (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/995,089

(22) Filed: Aug. 17, 2020

(65) Prior Publication Data
US 2021/0059015 A1 Feb. 25, 2021

Related U.S. Application Data

(60) Provisional application No. 62/889,465, filed on Aug. 20, 2019.

(51) Int. Cl.
*H04W 88/14* (2009.01)
*H04W 76/11* (2018.01)
(Continued)

(52) U.S. Cl.
CPC ......... *H04W 88/14* (2013.01); *H04W 56/001* (2013.01); *H04W 68/005* (2013.01);
(Continued)

(58) Field of Classification Search
CPC ..... H04W 88/14; H04W 76/11; H04W 76/27; H04W 72/0466; H04W 72/042;
(Continued)

(56) References Cited

U.S. PATENT DOCUMENTS

2014/0080468 A1\* 3/2014 Zhang ................... H04W 24/02
455/418
2015/0065112 A1 3/2015 Lee et al.
(Continued)

FOREIGN PATENT DOCUMENTS

| EP | 2692168 A1 | 2/2014 |
| GB | 2504756 A | 2/2014 |
| WO | 2019074982 A1 | 4/2019 |

OTHER PUBLICATIONS

"3rd Generation Partnership Project; Technical Specification Group Radio Access Network; Study on Integrated Access and Backhaul (Release 15)," TR 38.874 0.7.0, Centre, 650 Route Des Lucioles, F-06921, Sophia-Antipolis Cedex, France, (Nov. 8, 2018), XP051591963, pp. 1-111, Retrieved on Nov. 28, 2018 from: URL: http://www.3gpp.org/ftp/Email%5FDiscussions/RAN2/[RAN2%23104]/[104%2326][IAB]%20TR%2038%2E874/TR%2038874%20v070%20%2D%20final%20%2Dtrch%2Ezip paragraph [06. 1]-paragraph [7. 3. 2] paragraph [0009]-paragraph [9.7.13].
(Continued)

*Primary Examiner* — Afshawn M Towfighi
(74) *Attorney, Agent, or Firm* — Procopio, Cory, Hargreaves & Savitch

(57) ABSTRACT

An apparatus receives an indication of a Physical Cell Identifier (PCI) change for a serving integrated access and backhaul (IAB) node and uses the new PCI value for receiving communication from the serving IAB node based on the indication of the PCI change. The apparatus may comprise a user equipment (UE) or a mobile termination (MT) of a child IAB node that is served by the IAB node.

36 Claims, 13 Drawing Sheets

(51) Int. Cl.
*H04W 76/27* (2018.01)
*H04W 72/04* (2009.01)
*H04W 68/00* (2009.01)
*H04W 56/00* (2009.01)
*H04W 80/02* (2009.01)

(52) U.S. Cl.
CPC ..... *H04W 72/042* (2013.01); *H04W 72/0466* (2013.01); *H04W 76/11* (2018.02); *H04W 76/27* (2018.02); *H04W 80/02* (2013.01)

(58) Field of Classification Search
CPC . H04W 68/005; H04W 56/001; H04W 80/02; H04W 48/12; H04W 84/005; H04W 84/047; H04W 24/02
See application file for complete search history.

(56) References Cited

U.S. PATENT DOCUMENTS

| | | | |
|---|---|---|---|
| 2017/0105206 A1* | 4/2017 | Maattanen | H04L 5/0091 |
| 2019/0182716 A1* | 6/2019 | Futaki | H04W 28/20 |
| 2020/0053629 A1* | 2/2020 | Majmundar | H04W 36/023 |
| 2020/0145860 A1* | 5/2020 | Koskela | H04W 24/02 |
| 2020/0314738 A1* | 10/2020 | Qi | H04W 76/27 |
| 2020/0413457 A1* | 12/2020 | Hong | H04W 76/10 |
| 2021/0058835 A1 | 2/2021 | Luo et al. | |

OTHER PUBLICATIONS

Ericsson: "On NR paging design", 3GPP Draft, R1-1716153, Paging, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051339611, Retrieved from the Internet: URL: http://www.3gpp.org/ftp/Meetings_3GPP_SYNC/RAN1/Docs/ [retrieved on Sep. 17, 2017], 5 pages.
International Search Report and Written Opinion—PCT/US2020/046868—ISA/EPO—Nov. 3, 2020.

* cited by examiner

INDICATION OF A PCI CHANGE IN A MOBILE IAB NETWORK

CROSS REFERENCE TO RELATED APPLICATION(S)

This application claims the benefit of U.S. Provisional Application Ser. No. 62/889,465, entitled "Indication of a PCI Change in a Mobile IAB Network" and filed on Aug. 20, 2019, which is expressly incorporated by reference herein in its entirety.

BACKGROUND

Technical Field

The present disclosure relates generally to communication systems, and more particularly, to integrated access and backhaul (IAB) networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Integrated access and backhaul (IAB) networks may include multiple cells in communication with each other to provide an access network and a backhaul network to a core network. An IAB network may include a mobile IAB node that may move to different geographic locations within an area covered by the IAB network. Each IAB node may have a Physical Cell Identifier (PCI). The PCI may be reused by multiple geographically separate cells within a network. When moving within the area covered by the IAB network, the mobile IAB node may come into proximity with another stationary or mobile IAB node that may have the same PCI as the mobile IAB node. The situation may be referred to as a PCI collision. Aspects presented herein address possible PCI collisions.

In an aspect of the disclosure, a method, a computer-readable medium, and an apparatus are provided for wireless communication. The apparatus receives an indication of a PCI change for a serving IAB node and uses the new PCI value for receiving communication from the serving IAB node based on the indication of the PCI change.

In an aspect of the disclosure, a method, a computer-readable medium, and an apparatus are provided for wireless communication. The apparatus determines a PCI change for a serving IAB node and transmits an indication of the PCI change to at least one of a user equipment (UE) or a mobile termination (MT) of a child IAB node that is served by the IAB node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
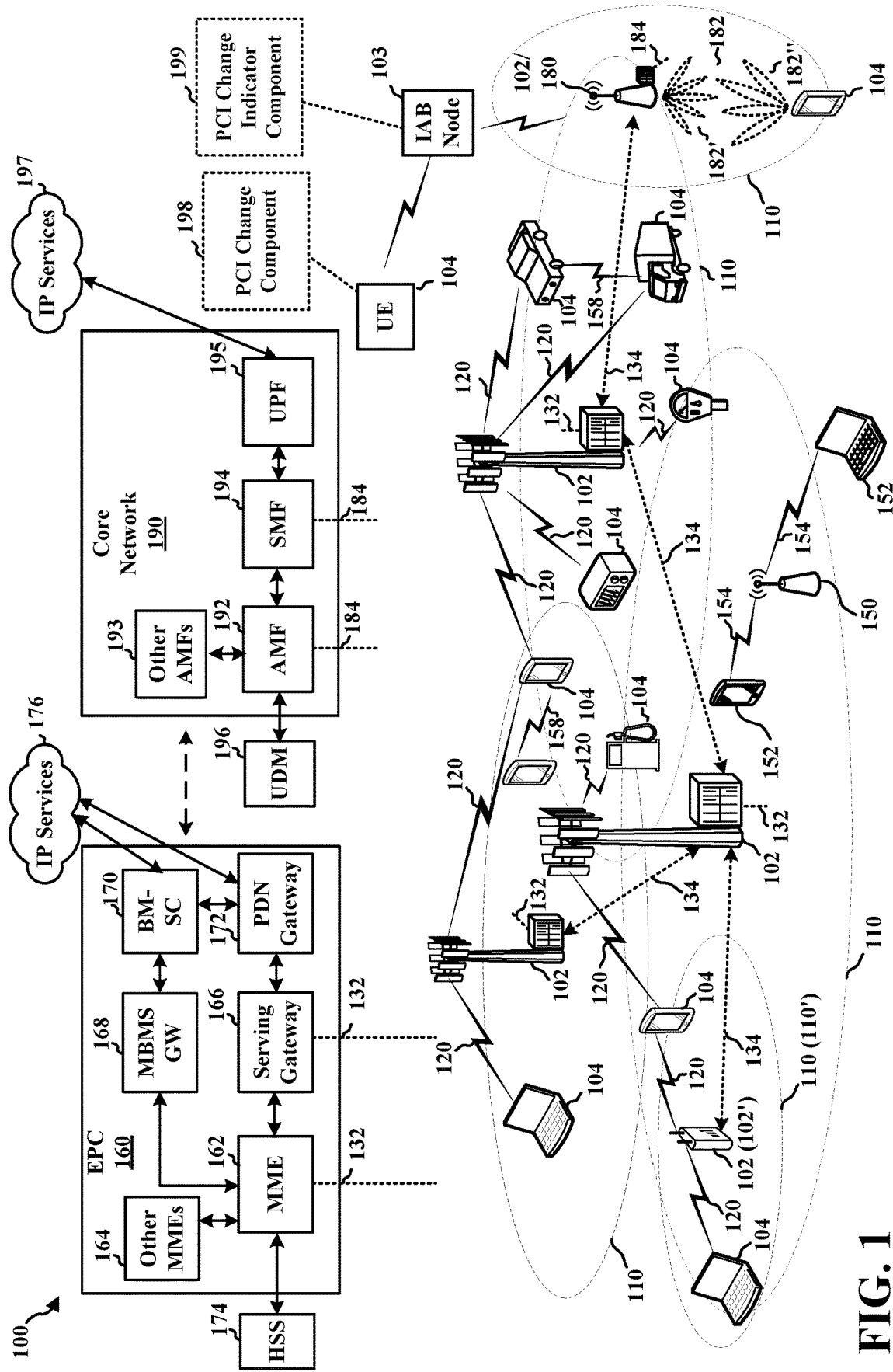
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, an IAB node, for example, the base station 180, may be configured to determine a configuration associated with PCI management of a PCI of the IAB node. The IAB node may comprise a changing component 198 configured to change the PCI of the IAB node based on the determined configuration. Although the following description may be focused on 5G NR, the concepts described herein may be applicable to other similar areas, such as LTE, LTE-A, CDMA, GSM, and other wireless technologies.

Figure 2:
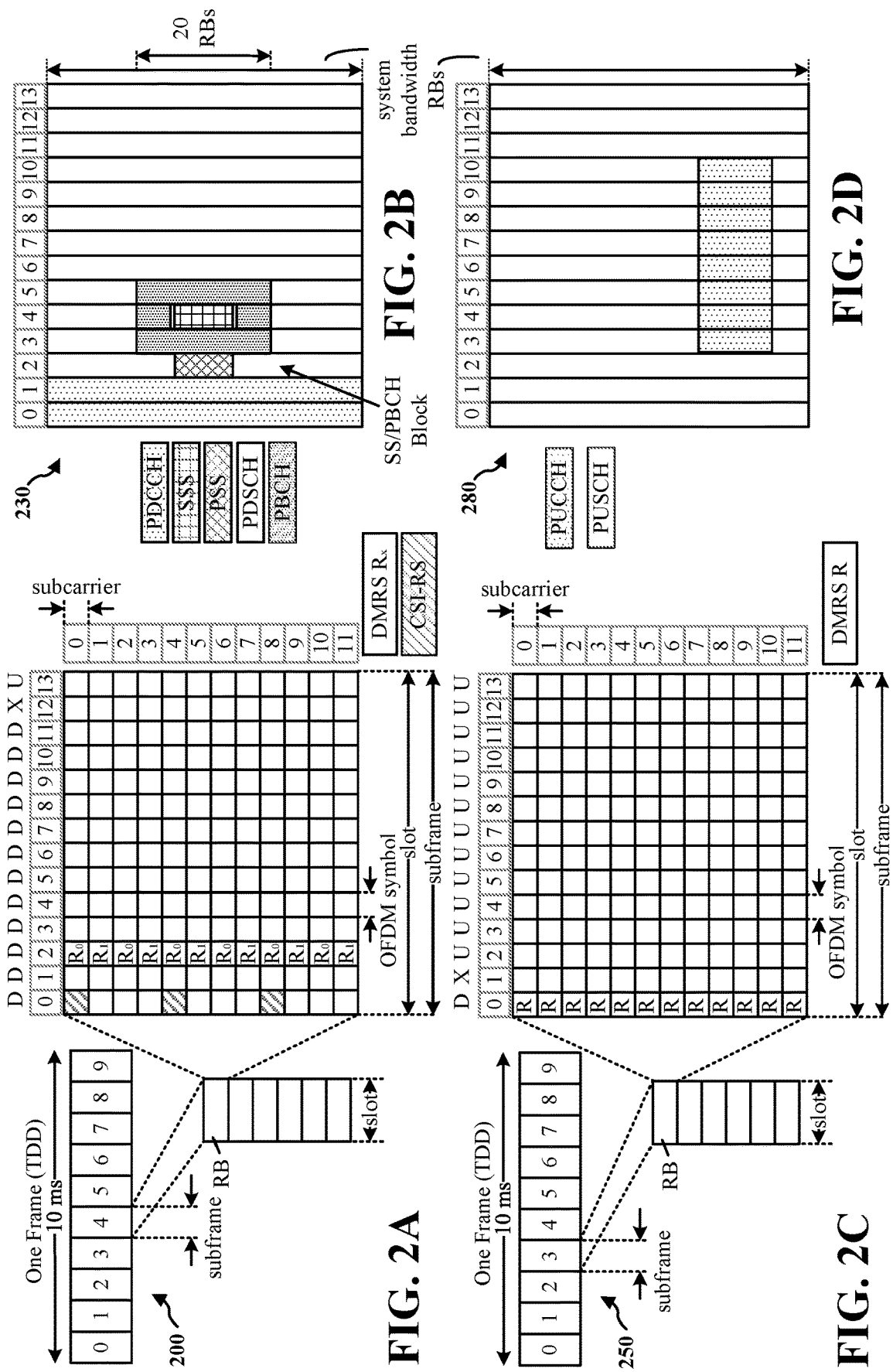
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structures and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu s$.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a PCI. Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
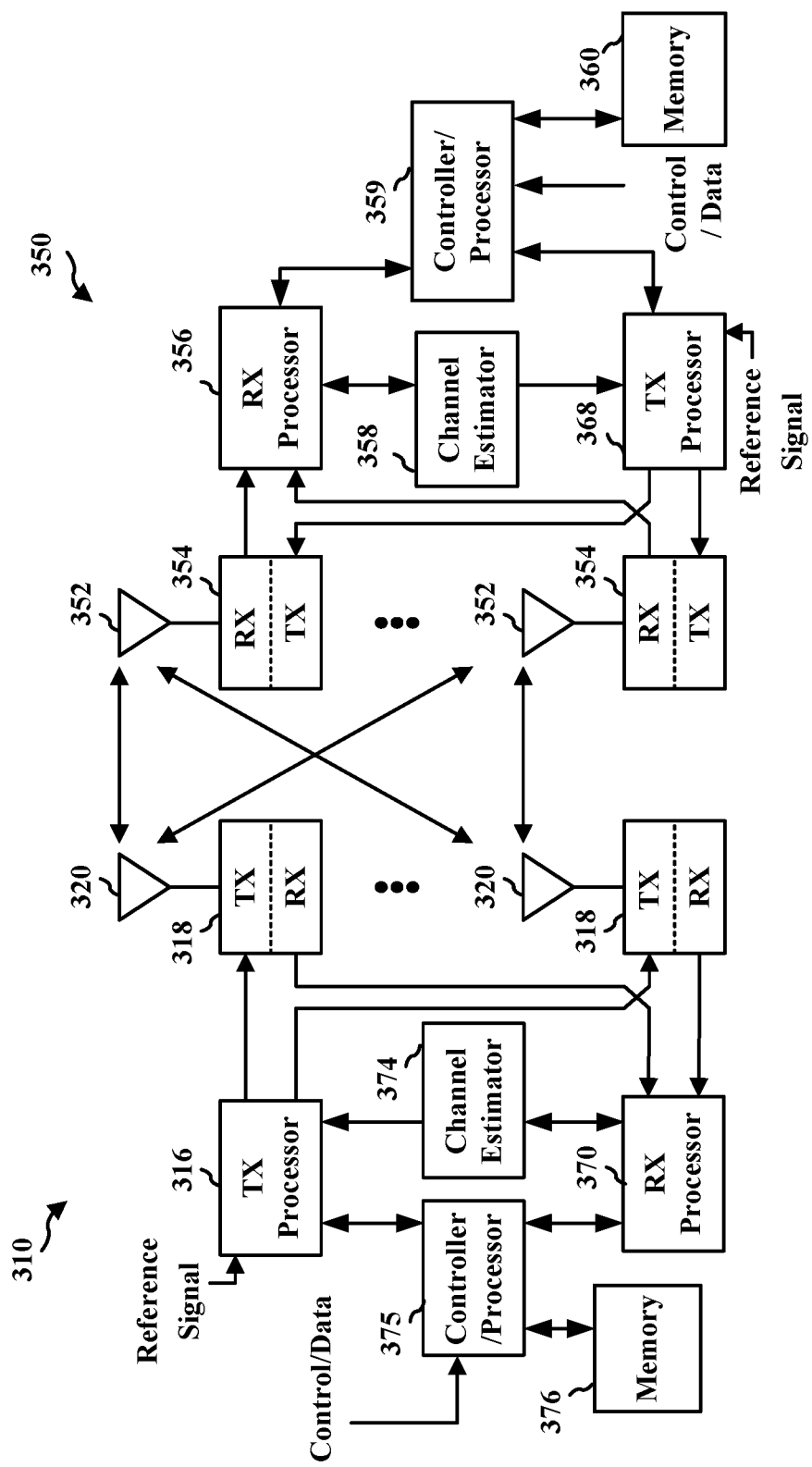
FIG. 3 is a diagram illustrating an example of an IAB node and user equipment (UE) in a network.

FIG. 3 is a block diagram of an IAB node 310 in communication with a UE 350 in an access network. In the DL, IP packets from the EPC 160 or core network 190 may be provided to a controller/processor 375. The controller/processor 375 implements layer 3 and/or layer 2 functionality. Layer 3 includes a radio resource control (RRC) layer, and may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the IAB node 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
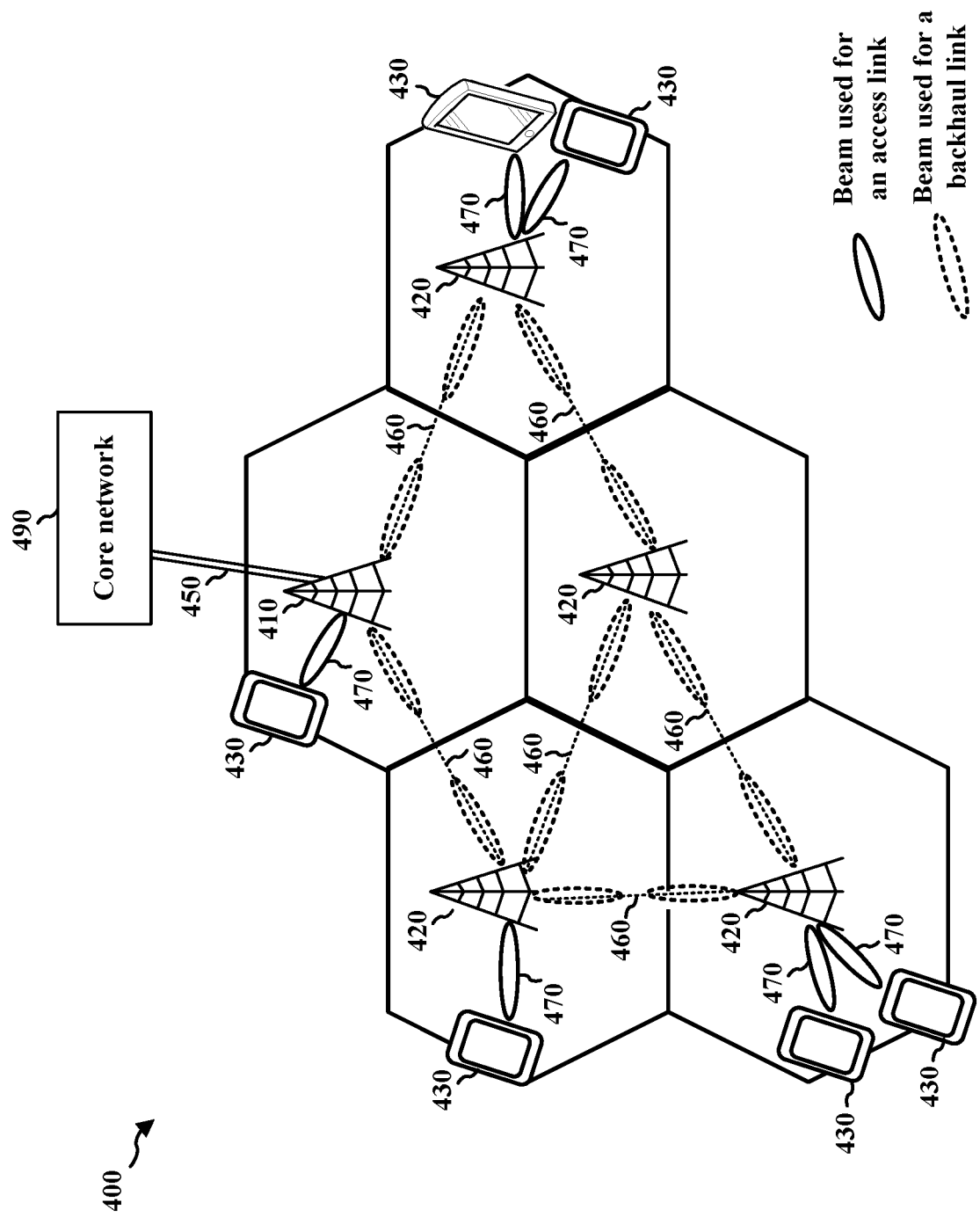
FIG. 4 is a diagram illustrating an example IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
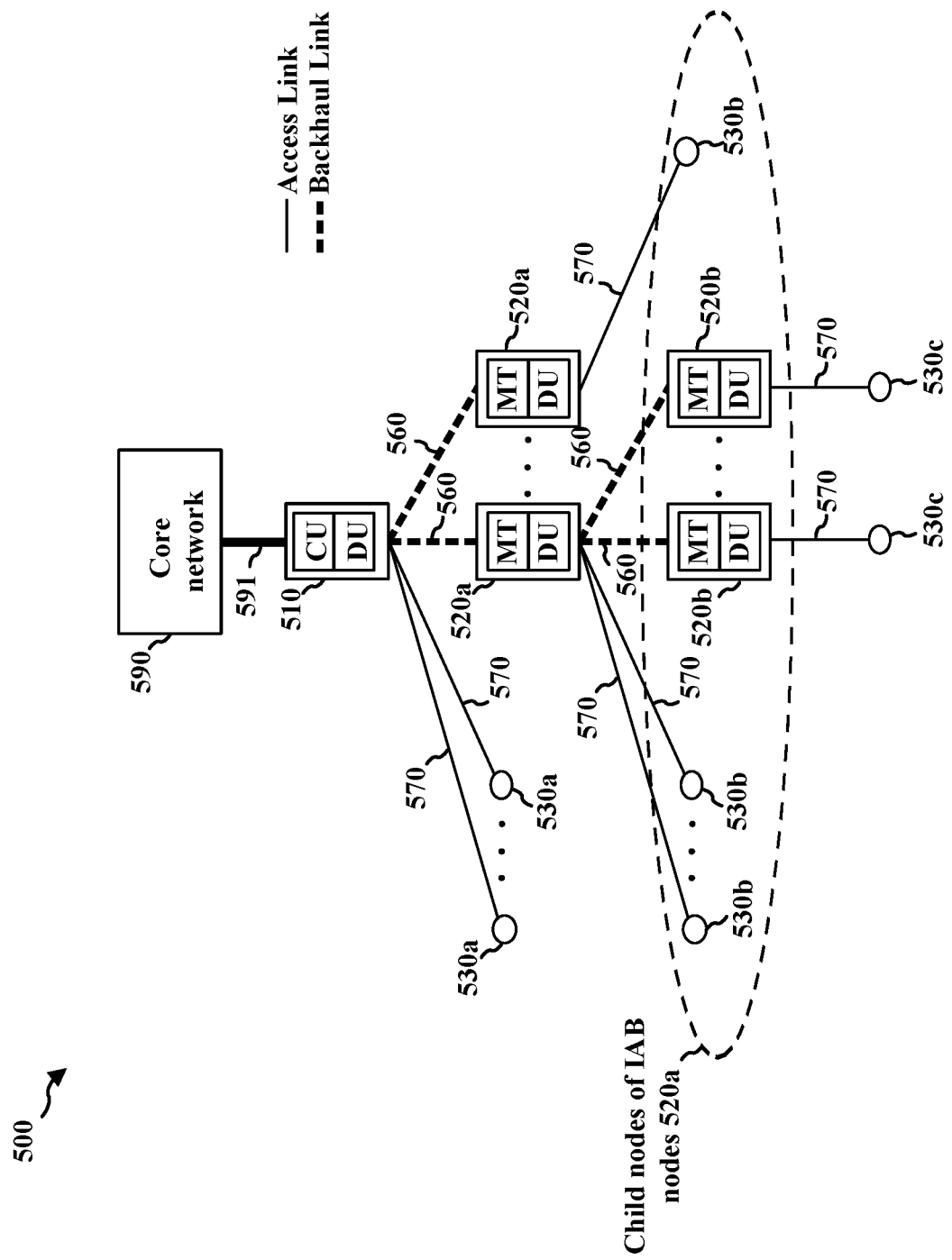
FIG. 5 is a diagram illustrating an example IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the patter of a parent IAB node comprising a DU that schedules a child IAB node/child UE may continue.

Figure 6:
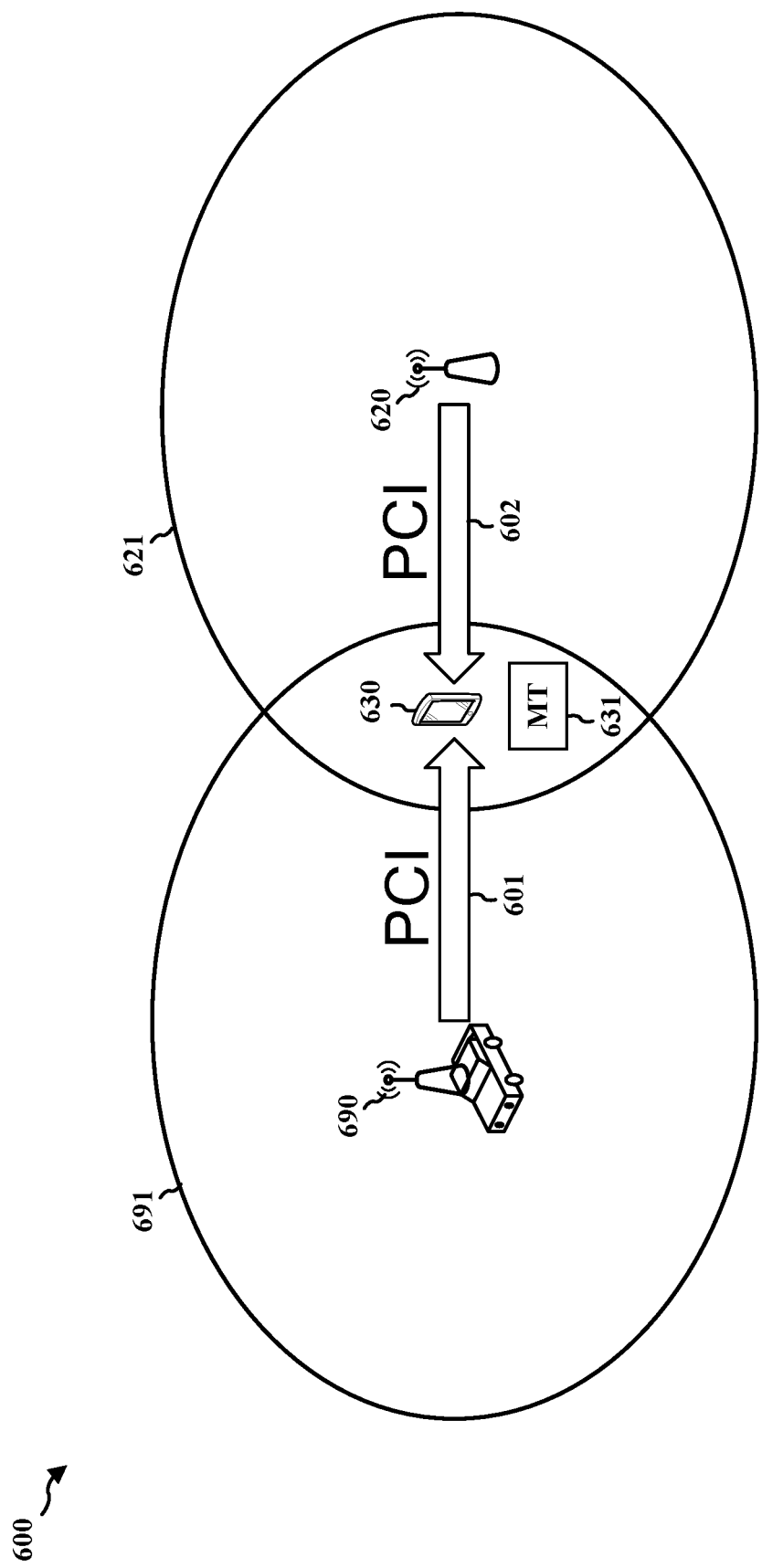
FIG. 6 illustrates nodes of an example IAB network including mobile IAB nodes.

FIG. 6 illustrates nodes of an example IAB network 600 including at least one mobile IAB node. The IAB network 600 includes a mobile IAB node 690 having a coverage area 691 and a second IAB node 620 having a coverage area 621. The second IAB node 620 may be stationary or may be another mobile IAB node. The mobile IAB node 690 may move to different geographic locations within an area covered by the mobile IAB network 600. For example, an IAB node may be installed on a bus, a taxi, a train, etc. In some aspects, the mobile IAB node 690 may correspond to a leaf node in the mobile IAB network 600, which may be the last hop IAB-node with only child access UEs connected to it. The mobile IAB node 690 may have no child IAB nodes. In other aspects, the mobile IAB node 690 may be allowed to have another IAB-node as its child node.

As described above, each IAB node may be associated with a particular PCI. The PCI may be an identifier for a cell Due to the limited number of possible PCI values, the PCI may be reused by multiple geographic separated cells in a network. For example, cells with a same PCI may be distinguished by a unique Cell Global Identifiers (NCGI) of a respective cell. The PCI may be carried by PSS/SSS in an SSB block from the IAB node. The PCI may be used to determine scrambling sequence of physical signal or physical channels transmitted by the IAB node. As an example, any of a Physical Broadcast Channel (PBCH), a PDCCH (e.g., PDCCH CoreSet0), a cell-specific PDSCH transmission, etc. from the IAB node may be scrambled based on the PCI for the IAB node. For example, the PCI may be used as a scrambling seed for scrambling the channels. Other channels may be scrambled based on another scrambling seed.

When moving within the area covered by the mobile IAB network 600, the mobile IAB node 690 may come into proximity with the second IAB node 620 that may have the same PCI as the mobile IAB node 690. As signals 601, 602 from the two IAB nodes may be scrambled based on the same PCI, a UE 530 receiving signals 601, 602 from both the mobile IAB node 690 and the second IAB node 620 may not be able to correctly identify the source of the signal, e.g., may be unable to differentiate between signal 601 from IAB node 690 and signal 602 from IAB node 620. For example, a UE may not be able to determine which cell (e.g., IAB node 690 or IAB node 620) a reference signal originated from. The use of a same PCI value by IAB nodes within proximity of each other may be referred to as a PCI collision. PCI collision may lead to issues with timing synchronization and channel estimation, and may further cause decoding failures for data traffic transmitted from at least one of these two neighboring cells. The PCI collision may similarly occur for an MT 631. The PCI of one of the IAB nodes 620, 690 may be changed to resolve a potential PCI collision.

For an active child UE 630 or child MT 631, data service may be interrupted due to the PCI change. After the PCI of a serving IAB-node is changed, the connected UE or MT may continue to attempt to communicate with its serving cell based on the previous PCI. The attempts based on a prior PCI may cause a radio link failure for the UE or MT. Reconnecting to the serving cell with the changed PCI value via cell re-selection procedure may take additional time and cause a delay in the data communication between the UE or MT and the serving cell. The network may send a handover message to redirect the UE or MT to the same serving cell with the changed PCI value. However, additional time would be used for the UE or MT perform the handover procedure, e.g. sending a RACH to the serving cell and exchanging messages to complete the handover and resume the data communication.

For an idle/inactive child UE or MT, the PCI change may lead to a longer call set up or a longer connection setup. The UE or MT may use a number of DRX cycles to filter radio resource management (RRM) measurements for cell-reselection. The UE or MT may use additional time to camp on the serving cell with the changed PCI value.

Figure 7:
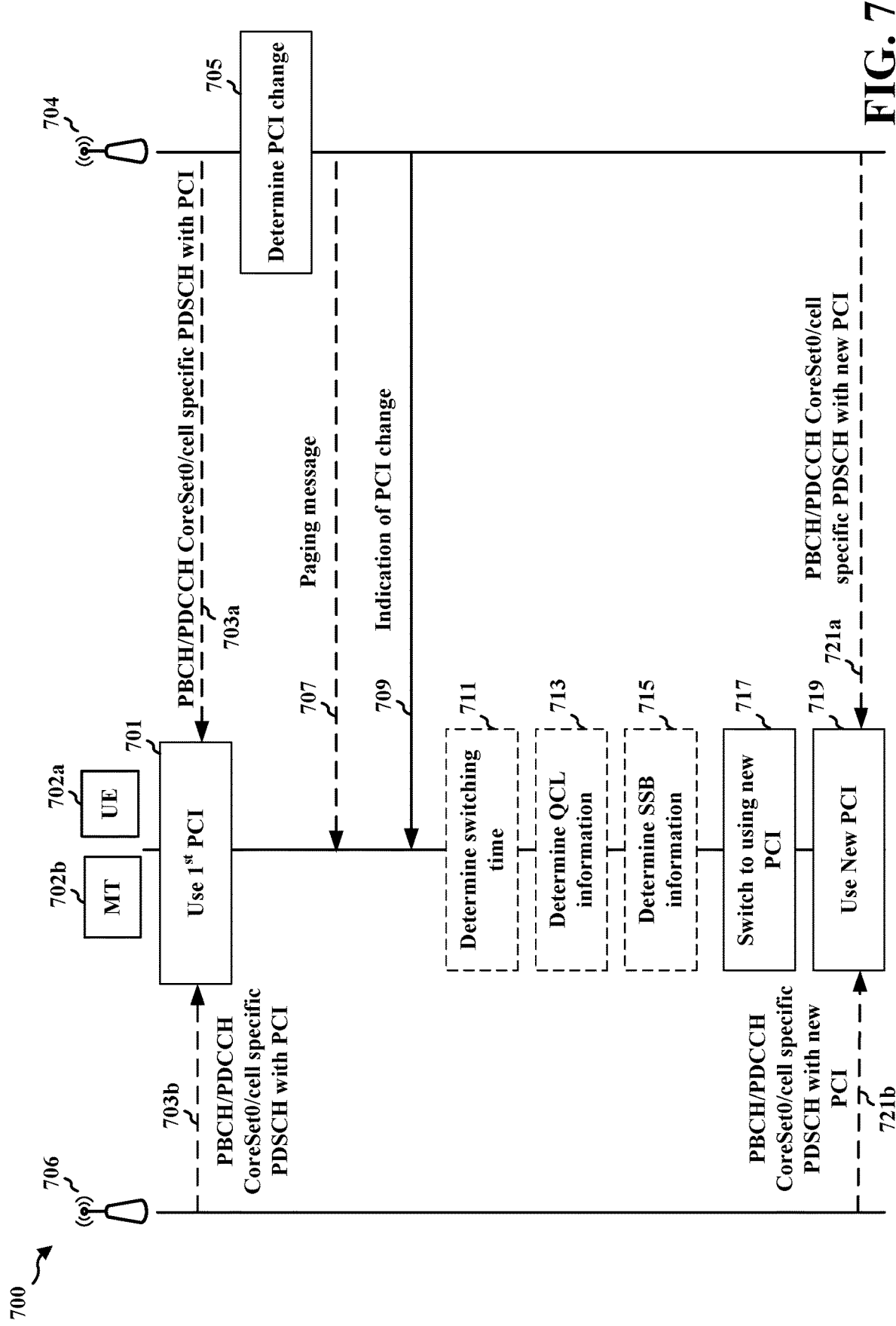
FIG. 7 illustrates an example communication flow between a UE or MT and an IAB node.

In order to assist the UE or MT in communicating with a serving IAB node that has a changed PCI, a new indication message may be sent to the UE or MT to indicate an incoming PCI change for the serving IAB node. FIG. 7 is an example communication flow 700 illustrating aspects of informing a UE 702*a* or MT 70*b* about a PCI change for a serving IAB node.

The IAB node 704 may determine, at 705 a PCI change for an IAB node serving the UE 702*a* or the MT 702*b*. The PCI change may be for IAB node 704 itself or may be for another IAB node, e.g., IAB node 706, serving the UE 702*a* or the MT 702*b*.

The indication message 709 may be part of an RRC message, a MAC-CE, and/or a physical layer message e.g. in DCI. The RRC message may be a UE-specific RRC message, a paging, and/or a SIB message. The DCI may be a UE-specific DCI or a group-common DCI.

The indication message to the UE or MT may indicate at least the new PCI value for the serving IAB node. The indication message may indicate a switch time for the new PCI, e.g., informing the UE or MT when to use the new PCI with the serving IAB node. The indication message may indicate a new SSB configuration for an SSB carrying the new PCI. For example, the indication message may indicate a new sync-raster, a new half-frame time offset, a new set of transmitted SSB blocks, SSB transmission power, etc. The indication message may indicate a new configuration for QCL information. For example, the indication message may indicate QCL information between the SSB blocks from the IAB node after PCI change and the SSB blocks before PCI change. As another example, the indication message may indicate QCL information between other channels from the serving IAB node (e.g., any of PDCCH, PDSCH, CSI-RS, etc.) and SSB blocks after PCI change for the serving IAB node. In some aspects, indications relating to the PCI change may be sent to the UE or MT in multiple messages.

Some aspects may be defined for application in connection with a PCI change. For example, the UE or MT may apply a predefined switch time for using the new PCI value with the serving IAB node after reception of this indication message informing the UE or MT of the PCI change. Therefore, rather than receiving the switching time in an indication from the network, the UE or MT may apply a switching time that is known by the UE or MT. As well, the configuration or SSB and/or QCL information following a PCI change may be predefined. Therefore, the UE or MT may monitor for SSB and/or apply a QCL relationship following receipt of the indication of the PCI change based on SSB configuration information or QCL information known to the UE or MT. As an example, the UE or MT may continue to apply an existing SSB configuration and/or QCL information after receiving an indication of a PCI change for the serving IAB node unless an updated configuration is explicitly signaled to the UE or MT. This may enable a UE or MT to use existing serving beams for communication after a PCI change for the serving IAB node, which may help provide a smoother transition for the UE or MT. As another example, the UE or MT may apply a predefined behavior following reception of the indication message informing the UE or MT about the PCI change for the serving IAB node. The predefined behavior may include updating the scrambling sequence used to decode communication from the IAB node based on the new PCI value. For example, the UE may use the new scrambling sequence to receive PBCH, PDCCH CoreSet0, cell specific PDSCH, etc. from the IAB node.

For a UE or MT in an idle mode or an RRC-inactive mode, a paging message may include an indication 709 of the PCI change for the serving IAB node. Therefore, the UE or MT may be notified about the PCI change when the paging message is received by including the indication 709 in the paging message.

In some aspects, a SIB message may include an indication of the PCI change for the serving IAB node. For example, a serving cell may first page inactive UE(s) or MT(s) and may provide an indication about a SIB modification. Then, the SIB may be provided, according to the SIB modification, that includes an indication of the PCI change for the serving IAB node. The UE 702*a* or MT 702*b* may receive the paging message 707 and determine the SIB modification. The UE or MT may use the SIB modification to monitor for a SIB and may determine the PCI change from the received SIB (e.g., indication 709 may be comprised in the SIB).

For an RRC-active UE/MT, the indication 709 of the PCI change can be conveyed by any combination of a UE-specific RRC message (L3 message), a MAC-CE (L2 message), or a DCI format (L1 message). The indication 709 of the PCI change may be included in a single message. In other aspects, the indication 709 of the PCI change may be indicated using multiple messages. Thus, the UE 702*a* or MT 702*b* may determine the PCI change based on multiple messages. For example, a lower layer message may select a value from among a set of values configured by a higher layer message.

As illustrated in FIG. 7, the UE may switch to using the new PCI at 717. The UE 702*a* or MT 702*b* may determine a switching time, at 711, based on information received from the network and/or based on information known to the UE 702a or the MT 702b. The UE 702a or the MT 702b may determine, at 713, QCL information, 713, for use after switching the PCI based on information received from the network and/or based on information known to the UE 702a or MT 702b. The UE 702a or the MT 702b may determine, at 715, SSB information in connection with the PCI change based on information received from the network and/or based on information known to the UE 702a or the MT 702b. Then, the UE 702a or the MT 702b may apply the new PCI to receive communication, whether 721a or 721b, from the serving IAB node.

Figure 8:
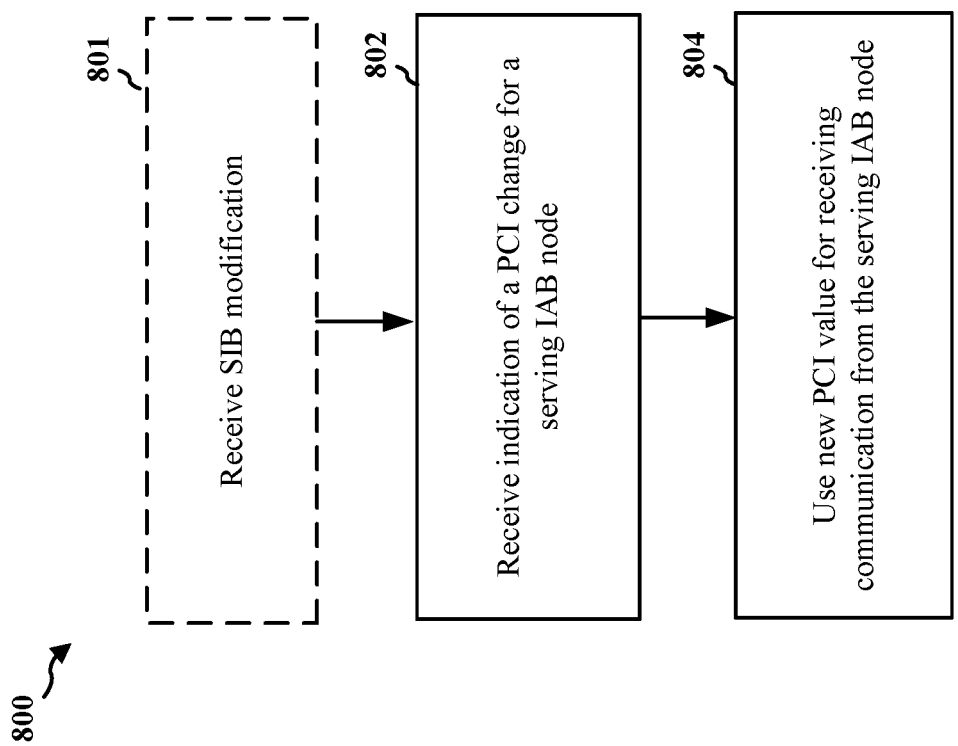
FIG. 8 is a flowchart of a method of wireless communication.

FIG. 8 is a flowchart 800 of a method of wireless communication. The method may be performed by a UE or a component of a UE (e.g., the UE 104, 350, 430, 630, 702a; the apparatus 902 or 1002, which may include the memory 360 and which may be the entire UE 350 or a component of the UE 350, such as the TX processor 368, the RX processor 356, and/or the controller/processor 359). The method may be performed by an MT of an IAB node (e.g., the IAB node 310, 520b; the apparatus 902 or 1002, which may include the memory 376 and which may be the entire IAB node 310 or a component of the IAB node 310, such as the TX processor 316, the RX processor 370, and/or the controller/processor 375). Optional aspects are illustrated with a dashed line. The method enables the a UE or an MT to handle a PCI change of an IAB node to avoid PCI collisions between IAB nodes.

At 802, the wireless device receives an indication of a PCI change for a serving IAB node. The wireless device may be a UE or an MT of a child IAB node. The indication may indicate the new PCI value. The indication of the PCI change may be received in at least one of an RRC message, a MAC CE, or DCI. The indication of the PCI change may be received, e.g., by PCI change component 908 of apparatus 902 or 1002 via reception component 904 or 1030.

For example, the indication of the PCI change may be received in the RRC message and may comprise at least one of a UE specific RRC message, a paging message, or a SIB message. The UE or the MT may be in an idle mode or an inactive mode and may receive the paging message indicating a SIB modification, at 801, and the indication of the PCI change may be received in the SIB message based on the SIB modification.

The method may be performed by a UE or MT of a child IAB node in an RRC-connected mode. The indication of the PCI change may be determined based on multiple messages comprising at least two of the RRC message, the MAC CE, or the DCI.

The indication of the PCI change is received in the DCI, and wherein the DCI comprises at least one of a UE specific DCI or a group common DCI.

The indication may include a switch time for applying the new PCI value. The indication may include an SSB configuration for an SSB carrying the new PCI value. The SSB configuration may include at least one of a sync-raster, a half-frame time offset, a set of SSB blocks, or an SSB transmission power. The indication may include a QCL configuration for QCL information. The QCL configuration may include QCL information between first SSB blocks prior to the PCI change and second SSB blocks following the PCI change. The QCL configuration may include QCL information between the second SSB blocks following the PCI change and a channel comprising at least one of a downlink control channel, a downlink shared channel, or a CSI-RS.

The indication may be received from the serving IAB node. The indication may be received from another serving IAB node. The indication 709 of the PCI change for the serving IAB node can be sent to the UE 702a and/or MT 702b from the serving cell that will perform the PCI change. For example, IAB node 704 sending the indication 709 may be the IAB node for which the PCI will be changed. Therefore, the UE 702a or MT 702b may use a first PCI, at 701, to receive communication 703a from IAB node 704 prior to receiving the indication 709 from IAB node 704. Then, after receiving the indication 709, the UE 702a or MT 702b may use the new PCI, at 719, to receive communication 721a from the IAB node 704.

Additionally, or alternatively, the indication of the PCI change for the serving IAB node can be sent to the UE 702a or the MT 702b from another serving cell. For example, a UE 702a configured for carrier aggregation or dual-connectivity may receive an indication of a PCI change for the serving IAB node from another serving cell. The indication message 709 may include a serving cell identifier (ID) indicating the serving cell to which the PCI change applies. If the indication of the PCI change is received from another serving cell, the serving cell ID may help the UE to determine the IAB node to which the PCI change applies. For example, in FIG. 7, IAB node 706 may be the node for which the PCI is being changed. Therefore, the UE 702a or MT 702b may use a first PCI, at 701, to receive communication 703b from IAB node 706 prior to receiving the indication 709 from IAB node 704. Then, after receiving the indication 709, the UE 702a or MT 702b may use the new PCI, at 719, to receive communication 721b from the IAB node 706.

At 804, the wireless device uses a new PCI value for receiving communication from the serving IAB node based on the indication of the PCI change. The new PCI value may be applied, e.g., by PCI component 910 in apparatus 902 or 1002 for receiving communication via reception component 904 or 1030. The wireless device may use the PCI to descramble communication received from the IAB node. The wireless device may apply the new PCI value based on an indicated switching time, based on the new SSB configuration, and/or the new QCL configuration. The wireless device may use the new PCI value based on a predefined switching time for the new PCI value following reception of the indication. The wireless device may use the new PCI value based on a predefined SSB configuration following the PCI change. The wireless device may use the new PCI value based on a predefined QCL configuration following the PCI change. The wireless device may use the new PCI value based on a predefined behavior based on the reception of the indication. The wireless device may use the new PCI value based on an update of a scrambling sequence using the new PCI value.

Figure 9:
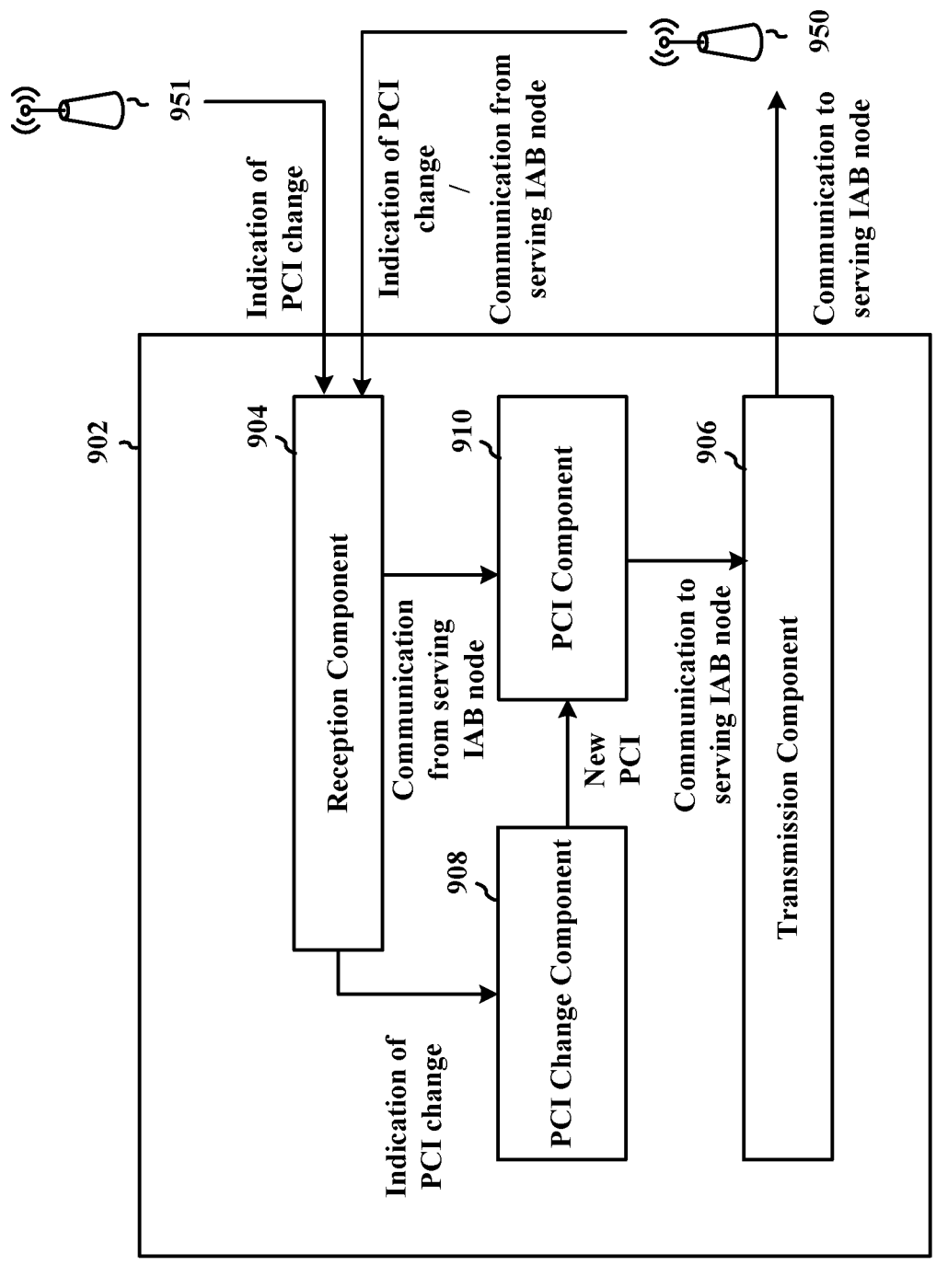
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE or a component of a UE. The apparatus may be a MT of a child IAB node or a component of the MT. The apparatus 902 includes a reception component 904 that receives communication from at least a serving IAB node. The communication from the serving IAB node may be based on a PCI for the serving IAB node 950. The apparatus 902 includes a transmission component 906 configured to transmit communication to the serving IAB node 950. The apparatus includes a PCI change component 908 configured to receive an indication of a PCI change for a serving IAB node, e.g., as described in connection with 802 in FIG. 8. The apparatus includes a PCI component 910 that uses a new PCI value for receiving communication from the serving IAB node based on the indication of the PCI change, e.g., as described in connection with 804 in FIG. 8. The indication may be received from the serving IAB node 950 or from another IAB node 951.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
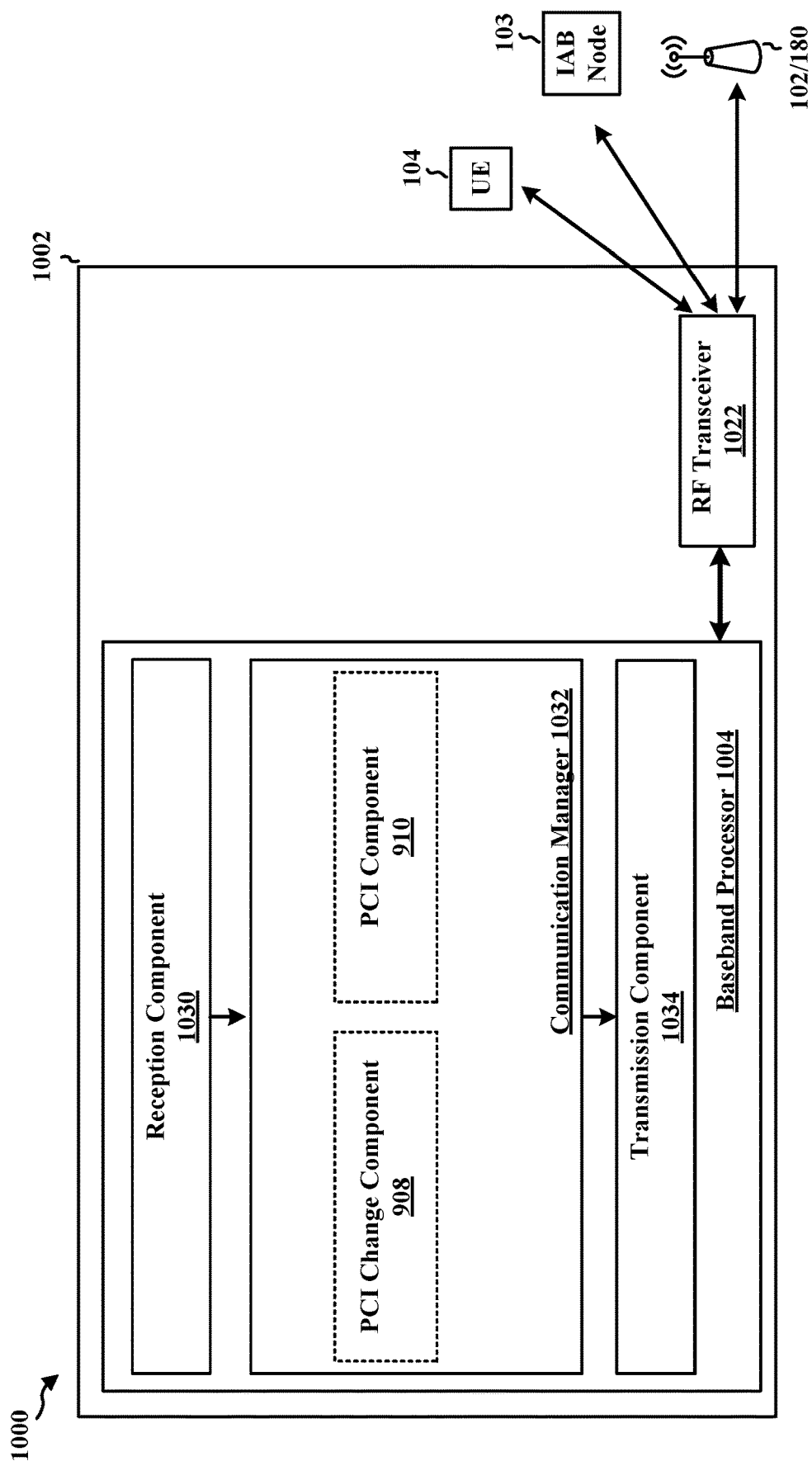
FIG. 10 is a diagram illustrating an example of a hardware implementation for an apparatus employing a processing system.

FIG. 10 is a diagram 1000 illustrating an example of a hardware implementation for an apparatus 1002. The apparatus 1002 is an IAB node, an MT, or a UE and includes a baseband unit 1004 and transceiver 1022. The baseband unit 1004 may communicate through a cellular RF transceiver with the UE 104 or may communicate through the RF transceiver 1022 with other IAB nodes or with a base station 102 or 180. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The apparatus 1002 may include the PCI change component 908 and/or the PCI component 910, as described in connection with FIG. 8 or FIG. 9. The baseband unit 1004 may be a component of the IAB node 310, e.g., an MT component of the IAB node, and may include the memory 376 and/or at least one of the TX processor 316, the RX processor 370, and the controller/processor 375. Alternatively, the baseband unit 1004 may be the entire IAB node (e.g., see 310 of FIG. 3). The baseband unit 1004 may be a component of the UE 350 and may include the memory 360 and/or at least one of the TX processor 368, the RX processor 356, and the controller/processor 359. Alternatively, the apparatus 1002 may be the entire UE (e.g., see 350 of FIG. 3).

In one configuration, the apparatus 902 or 1002 for wireless communication includes means for receiving an indication of a PCI change for a serving IAB node. The apparatus 902 or 1002 may include means for using a new PCI value for receiving communication from the serving IAB node based on the indication of the change. The apparatus 902 or 1002 may include means for receiving the paging message indicating a SIB modification, wherein the indication of the PCI change is received in the SIB message based on the SIB modification. The aforementioned means may be one or more of the aforementioned components of the apparatus 902 or 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and/or the controller/processor 359 or the TX processor 316, the RX processor 370, and/or the controller/processor 375 configured to perform the functions recited by the aforementioned means.

Figure 11:
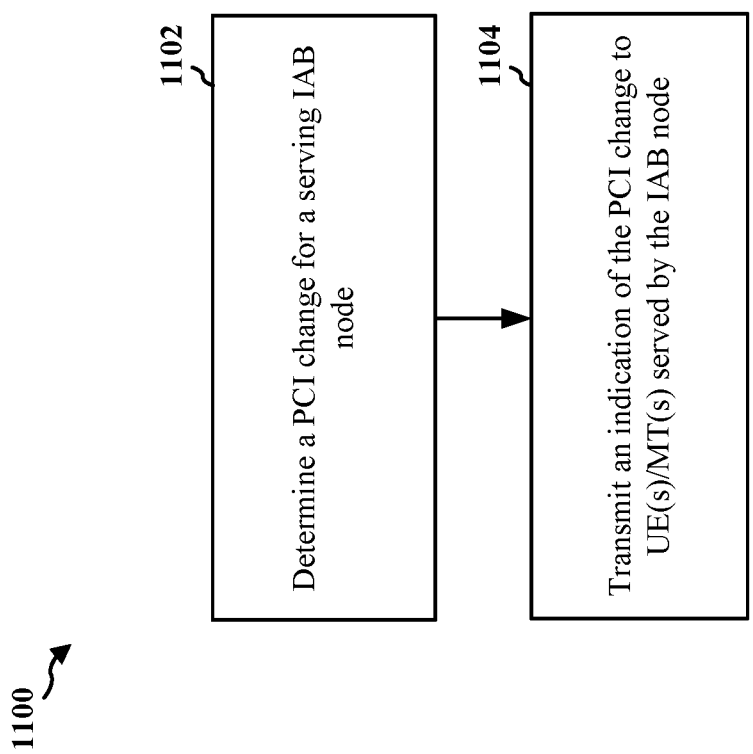
FIG. 11 is a flowchart of a method of wireless communication.

FIG. 11 is a flowchart 1100 of a method of wireless communication. The method may be performed by an IAB node or a component of an IAB node (e.g., the IAB node 103, 310, 410, 420, 620, 690, 704; the apparatus 1202 or 1302, which may include the memory 376 and which may be the entire IAB node 310 or a component of the IAB node 310, such as the TX processor 316, the RX processor 370, and/or the controller/processor 375).

At 1102, the wireless device determines a PCI change for an IAB node. The PCI change may be determined, e.g., by PCI change component 1208 of the apparatus 1202 or 1302. The wireless device may be the IAB node for which the PCI change is determined, and the indication may be transmitted by the IAB node itself to UE(s) or MT(s) served by the IAB node. The indication may be transmitted by another IAB node serving the UE or the MT.

At 1104, the wireless device transmits an indication of the PCI change to at least one of a UE or an MT of a child node that is served by the IAB node. The indication may be transmitted, e.g., by PCI indication component 1210 of the apparatus 1202 or 1302 via transmission component 1206 or 1334. The indication of the PCI may be transmitted in an RRC message, a MAC CE, and/or DCI.

The indication may be transmitted in an RRC message such as a UE specific RRC message, a paging message, or a system information block (SIB) message. The UE or the MT may be in an idle mode or an inactive mode, and the wireless device may transmit a paging message indicating a SIB modification, and transmit the indication of the PCI change in the SIB message based on the SIB modification.

The UE or the MT may be in an RRC-connected mode. The PCI change may be indicated using multiple messages comprising at least two of the RRC message, the MAC CE, or the DCI.

The indication of the PCI change may be transmitted in the DCI, e.g., a UE specific DCI and/or a group common DCI.

The indication may indicate a new PCI value. The indication may comprise a switch time for applying the new PCI value. The indication may include an SSB configuration for an SSB carrying the new PCI value. The SSB configuration may include at least one of a sync-raster, a half-frame time offset, a set of SSB blocks, or an SSB transmission power. The indication may include a QCL configuration for QCL information. The QCL configuration may include QCL information between first SSB blocks prior to the PCI change and second SSB blocks following the PCI change. The QCL configuration may include QCL information between the second SSB blocks following the PCI change and a channel comprising at least one of a downlink control channel, a downlink shared channel, or a CSI-RS.

Figure 12:
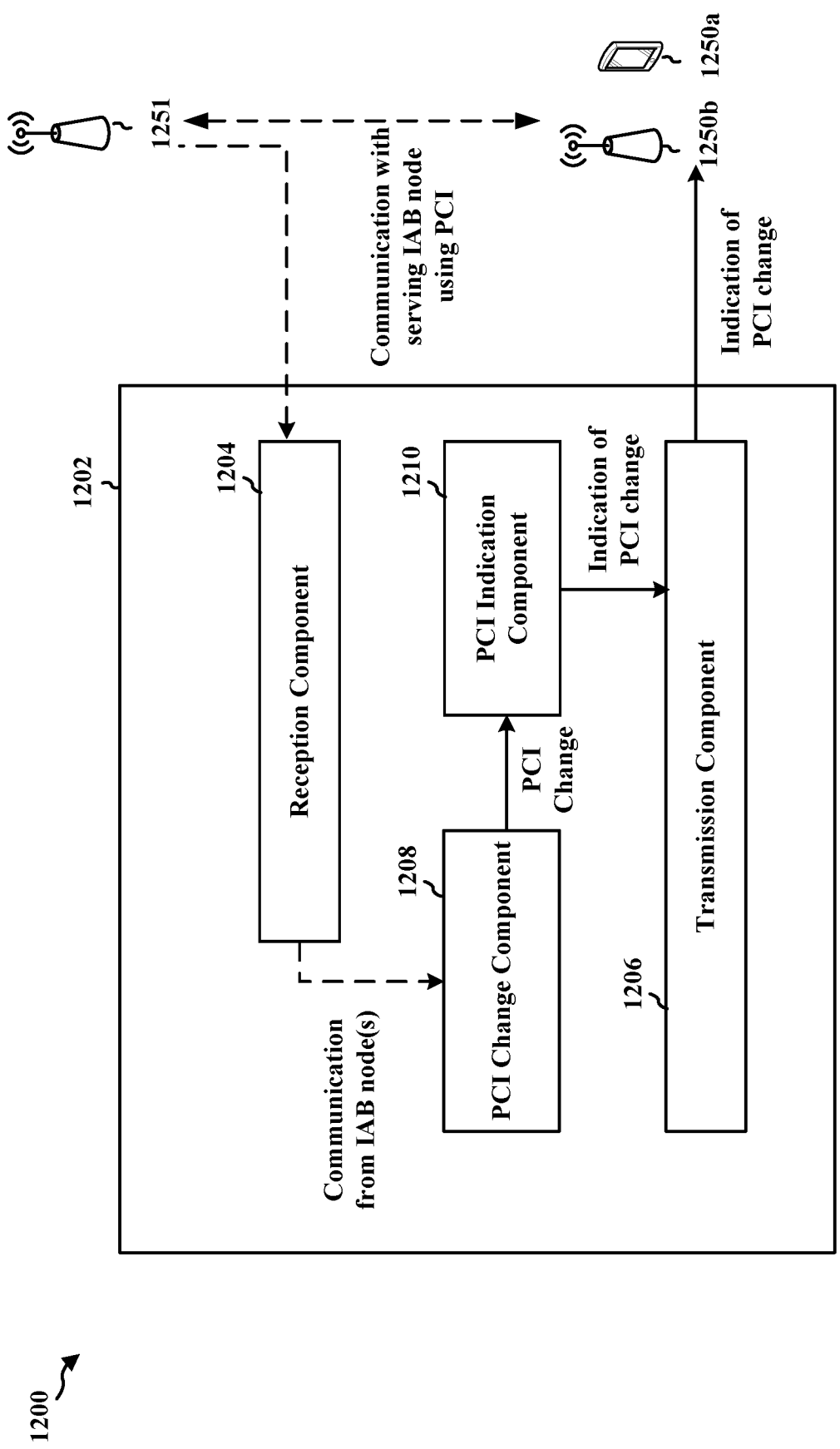
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be an IAB node. The apparatus includes a reception component 1204 that receives communication, e.g., from UE(s) 1250a or from other IAB nodes 1250b. The apparatus includes a transmission component 1206 that transmits communication to UE(s) 1250a and/or other IAB nodes 1250b. The apparatus includes a PCI change component 1208 that determines a PCI change for an IAB node, e.g., as described in connection with 1102 in FIG. 11. The apparatus 1202 may be the IAB node for which the PCI change is determined or a component of the IAB node for which the PCI change is determined. In another example, the IAB node may determine a PCI change for another IAB node 1251. The apparatus includes a PCI indication component 1210 that transmits an indication of the PCI change to at least one UE 1250*a* or MT of a child IAB node 1250*b* that is served by the IAB node, e.g., as described in connection with 1104 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
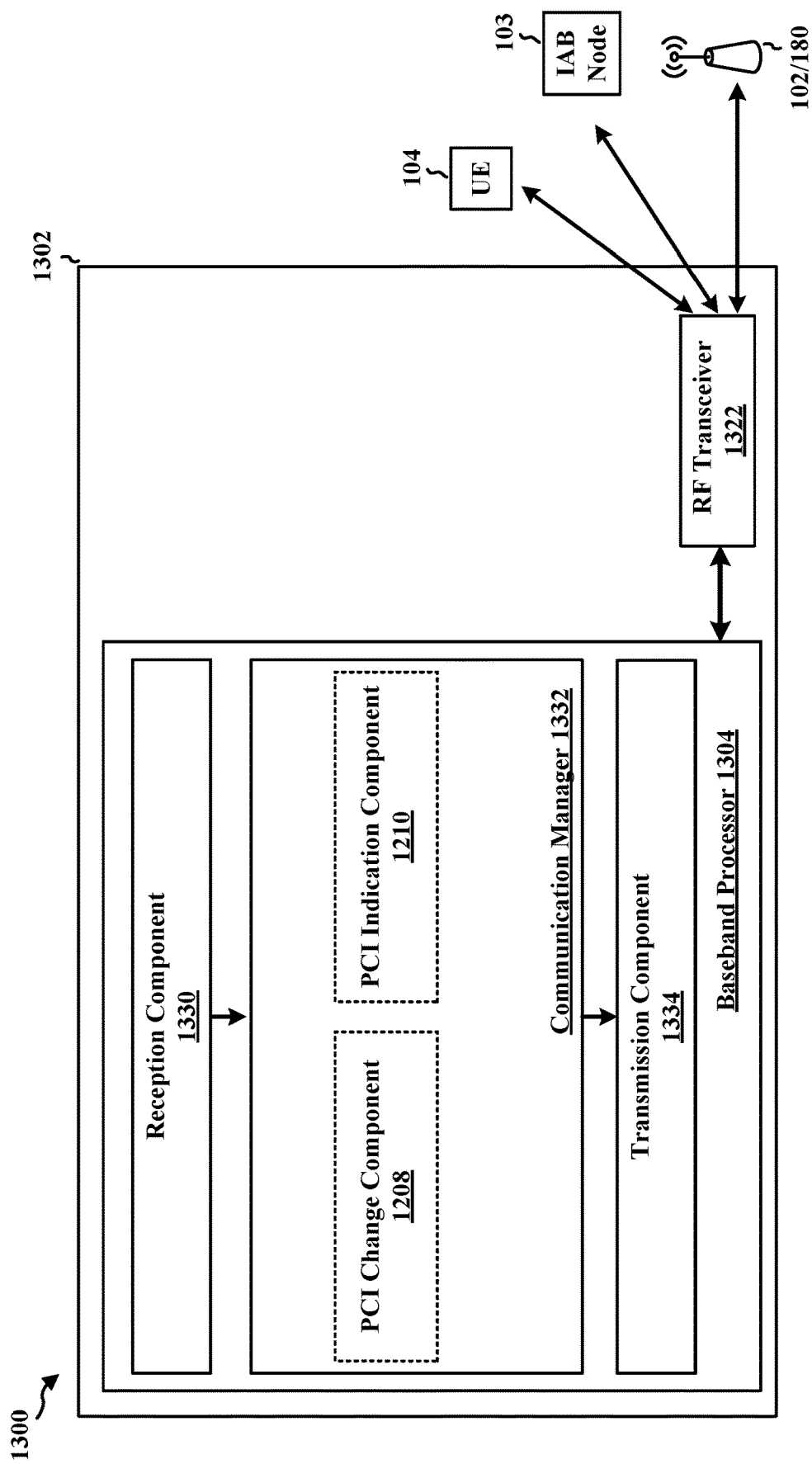
FIG. 13 is a diagram illustrating an example of a hardware implementation for an apparatus employing a processing system.

FIG. 13 is a diagram 1300 illustrating an example of a hardware implementation for an apparatus 1302. The apparatus 1302 is an IAB node and includes a baseband unit 1304 and transceiver 1322. The baseband unit 1304 may communicate through a cellular RF transceiver with the UE 104 or may communicate through the RF transceiver 1322 with other IAB nodes or with a base station 102 or 180. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304.

The baseband unit 1304 further includes at least one of the components 1208 or 1210. The components may be software components running in the baseband unit 1304, resident/stored in the computer readable medium/memory, one or more hardware components coupled to a processor, or some combination thereof. The baseband unit 1304 may be a component of the IAB node 310 and may include the memory 376 and/or at least one of the TX processor 316, the RX processor 370, and the controller/processor 375. Alternatively, the apparatus 1302 may be the entire IAB node (e.g., see 310 of FIG. 3).

In one configuration, the apparatus 1202 or 1302 for wireless communication includes means for determining a PCI change for an IAB node. The apparatus 1202 or 1302 may include means for transmitting an indication of the PCI change to at least one UE or MT of a child IAB node that is served by the IAB node. The aforementioned means may be one or more of the aforementioned components of the apparatus 1202 and/or 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other examples or teaching described herein, without limitation.

Example 1 is a method of wireless communication, comprising: receiving an indication of a PCI change for a serving IAB node; and using a new PCI value for receiving communication from the serving IAB node based on the indication of the PCI change.

In example 2, the method of Example 1 is performed by a user equipment or a MT of a child IAB node.

In Example 3, the method of Example 1 or Example 2 further includes that the indication of the PCI change is received in at least one of an RRC, a MAC-CE, or DCI.

In Example 4, the method of any of Examples 1-3 further includes that the indication of the PCI change is received in the RRC message, wherein the RRC message comprises at least one of a UE specific RRC message, a paging message, or a SIB message.

In Example 5, the method of any of Examples 1-4 further includes that the method is performed by a UE or a MT of a child IAB node, the UE or the MT being in an idle mode or an inactive mode, the method further comprising: receiving the paging message indicating a SIB modification, wherein the indication of the PCI change is received in the SIB message based on the SIB modification.

In Example 6, the method of any of Examples 1-5 further includes that the method is performed by a UE or a MT of a child IAB node in an RRC-connected mode.

In Example 7, the method of any of Examples 1-6 further includes that the indication of the PCI change is determined based on multiple messages comprising at least two of the RRC message, the MAC CE, or the DCI.

In Example 8, the method of any of Examples 1-7 further includes that the indication of the PCI change is received in the DCI, and wherein the DCI comprises at least one of a UE specific DCI or a group common DCI.

In Example 9, the method of any of Examples 1-8 further includes that the indication indicates the new PCI value.

In Example 10, the method of any of Examples 1-9 further includes that the indication comprises at least one of: a switch time for applying the new PCI value, an SSB configuration for an SSB carrying the new PCI value, or a QCL configuration for QCL information.

In Example 11, the method of any of Examples 1-10 further includes that the indication comprises the SSB configuration, and wherein the SSB configuration comprises at least one of a sync-raster, a half-frame time offset, a set of SSB blocks, or an SSB transmission power.

In Example 12, the method of any of Examples 1-11 further includes that the indication comprises the QCL configuration, and wherein the QCL configuration comprises at least one of: first QCL information between first SSB blocks prior to the PCI change and second SSB blocks following the PCI change, or second QCL information between the second SSB blocks following the PCI change and a channel comprising at least one of a downlink control channel, a downlink shared channel, or a CSI-RS.

In Example 13, the method of any of Examples 1-12 further includes that the new PCI value is used based on at least one of: a predefined switching time for the new PCI value following reception of the indication, a predefined SSB configuration following the PCI change, a predefined QCL configuration following the PCI change, or a predefined behavior based on the reception of the indication, or an update of a scrambling sequence using the new PCI value.

In Example 14, the method of any of Examples 1-13 further includes that the indication is received from the serving IAB node.

In Example 15, the method of any of Examples 1-14 further includes that the indication is received from another serving IAB node.

Example 16 is a device including one or more processors and one or more memories in electronic communication with the one or more processors storing instructions executable by the one or more processors to cause the device to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method of wireless communication, comprising: determining a PCI change for an IAB node; and transmitting an indication of the PCI change to at least one UE or MT of a child IAB node that is served by the IAB node.

In Example 20, the method of Example 19 further includes that the indication of the PCI change is transmitted in at least one of an RRC message, MAC-CE, or DCI.

In Example 21, the method of Example 19 or Example 20 further includes that the indication of the PCI change is transmitted in the RRC message, wherein the RRC message comprises at least one of a UE specific RRC message, a paging message, or a SIB message.

In Example 22, the method of any of Examples 19-21 further includes that the UE or the MT is in an idle mode or an inactive mode, the method further comprising: transmitting the paging message indicating a SIB modification, wherein the indication of the PCI change is transmitted in the SIB message based on the SIB modification.

In Example 23, the method of any of Examples 19-22 further includes that the UE or the MT is in an RRC-connected mode.

In Example 24, the method of any of Examples 19-23 further includes that the PCI change is indicated using multiple messages comprising at least two of the RRC message, the MAC CE, or the DCI.

In Example 25, the method of any of Examples 19-24 further includes that the indication of the PCI change is transmitted in the DCI, and wherein the DCI comprises at least one of a UE specific DCI or a group common DCI.

In Example 26, the method of any of Examples 19-25 further includes that the indication indicates a new PCI value.

In Example 27, the method of any of Examples 19-26 further includes that the indication comprises at least one of: a switch time for applying a new PCI value, an SSB configuration for an SSB carrying the new PCI value, or a QCL configuration for QCL information.

In Example 28, the method of any of Examples 19-27 further includes that the indication comprises the SSB configuration, and wherein the SSB configuration comprises at least one of a sync-raster, a half-frame time offset, a set of SSB blocks, or an SSB transmission power.

In Example 29, the method of any of Examples 19-28 further includes that the indication comprises the QCL configuration, and wherein the QCL configuration comprises at least one of: first QCL information between first SSB blocks prior to the PCI change and second SSB blocks following the PCI change, or second QCL information between the second SSB blocks following the PCI change and a channel comprising at least one of a downlink control channel, a downlink shared channel, or a CSI-RS.

In Example 30, the method of any of Examples 19-29 further includes that the indication is transmitted by the IAB node.

In Example 31, the method of any of Examples 19-30 further includes that the indication is transmitted by another IAB node serving the UE or the MT.

Example 32 is a device including one or more processors and one or more memories in electronic communication with the one or more processors storing instructions executable by the one or more processors to cause the device to implement a method as in any of Examples 19-31.

Example 33 is a system or apparatus including means for implementing a method or realizing an apparatus as in any of Examples 19-31.

Example 34 is a non-transitory computer readable medium storing instructions executable by one or more processors to cause the one or more processors to implement a method as in any of Examples 19-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving an indication of a physical cell identifier (PCI) change for a serving integrated access and backhaul (IAB) node, wherein the indication comprises at least one of a switch time for applying a new PCI value, a synchronization signal block (SSB) configuration for an SSB carrying the new PCI value, or a quasi-co-location (QCL) configuration for QCL information; and
using the new PCI value for receiving communication from the serving IAB node based on the indication of the PCI change.

2. The method of claim 1, wherein the method is performed by a user equipment or a mobile termination (MT) of a child IAB node.

3. The method of claim 1, wherein the indication of the PCI change is received in at least one of a radio resource control (RRC) message, a medium access control (MAC) control element (CE), or downlink control information (DCI).

4. The method of claim 3, wherein the indication of the PCI change is received in the RRC message, wherein the RRC message comprises at least one of a UE specific RRC message, a paging message, or a system information block (SIB) message.

5. The method of claim 4, wherein the method is performed by a user equipment (UE) or a mobile termination (MT) of a child IAB node, the UE or the MT being in an idle mode or an inactive mode, the method further comprising:
receiving the paging message indicating a SIB modification, wherein the indication of the PCI change is received in the SIB message based on the SIB modification.

6. The method of claim 3, wherein the method is performed by a user equipment (UE) or a mobile termination (MT) of a child IAB node in an RRC-connected mode.

7. The method of claim 6, wherein the indication of the PCI change is determined based on multiple messages comprising at least two of the RRC message, the MAC CE, or the DCI.

8. The method of claim 3, wherein the indication of the PCI change is received in the DCI, and wherein the DCI comprises at least one of a UE specific DCI or a group common DCI.

9. The method of claim 1, wherein the indication indicates the new PCI value.

10. The method of claim 1, wherein the indication comprises the SSB configuration, and wherein the SSB configuration comprises at least one of a sync-raster, a half-frame time offset, a set of SSB blocks, or an SSB transmission power.

11. The method of claim 1, wherein the indication comprises the QCL configuration, and wherein the QCL configuration comprises at least one of:
first QCL information between first SSB blocks prior to the PCI change and second SSB blocks following the PCI change, or
second QCL information between the second SSB blocks following the PCI change and a channel comprising at least one of a downlink control channel, a downlink shared channel, or a channel state information reference signal (CSI-RS).

12. The method of claim 1, wherein the new PCI value is used based on at least one of:
a predefined switching time for the new PCI value following reception of the indication,
a predefined synchronization signal block (SSB) configuration following the PCI change,
a predefined quasi-co-location (QCL) configuration following the PCI change,
a predefined behavior based on the reception of the indication, or
an update of a scrambling sequence using the new PCI value.

13. The method of claim 1, wherein the indication is received from the serving IAB node.

14. The method of claim 1, wherein the indication is received from another serving IAB node.

15. The method of claim 1, wherein the indication of the PCI change comprises the SSB configuration for the SSB carrying the new PCI value.

16. The method of claim 1, wherein the indication of the PCI change comprises QCL configuration for the QCL information.

17. A method of wireless communication, comprising:
determining a physical cell identifier (PCI) change for an integrated access and backhaul (IAB) node; and
transmitting an indication of the PCI change to at least one user equipment (UE) or mobile termination (MT) of a child IAB node that is served by the IAB node, wherein the indication comprises at least one of a switch time for applying a new PCI value, a synchronization signal block (SSB) configuration for an SSB carrying the new PCI value, or a quasi-co-location (QCL) configuration for QCL information.

18. The method of claim 17, wherein the indication of the PCI change is transmitted in at least one of a radio resource control (RRC) message, a medium access control (MAC) control element (CE), or downlink control information (DCI).

19. The method of claim 18, wherein the indication of the PCI change is transmitted in the RRC message, wherein the RRC message comprises at least one of a UE specific RRC message, a paging message, or a system information block (SIB) message.

20. The method of claim 19, wherein the UE or the MT is in an idle mode or an inactive mode, the method further comprising:
transmitting the paging message indicating a SIB modification, wherein the indication of the PCI change is transmitted in the SIB message based on the SIB modification.

21. The method of claim 18, wherein the UE or the MT is in an RRC-connected mode.

22. The method of claim 21, wherein the PCI change is indicated using multiple messages comprising at least two of the RRC message, the MAC CE, or the DCI.

23. The method of claim 18, wherein the indication of the PCI change is transmitted in the DCI, and wherein the DCI comprises at least one of a UE specific DCI or a group common DCI.

24. The method of claim 17, wherein the indication indicates the new PCI value.

25. The method of claim 17, wherein the indication comprises the SSB configuration, and wherein the SSB configuration comprises at least one of a sync-raster, a half-frame time offset, a set of SSB blocks, or an SSB transmission power.

26. The method of claim 17, wherein the indication comprises the QCL configuration, and wherein the QCL configuration comprises at least one of:
- first QCL information between first SSB blocks prior to the PCI change and second SSB blocks following the PCI change, or
- second QCL information between the second SSB blocks following the PCI change and a channel comprising at least one of a downlink control channel, a downlink shared channel, or a channel state information reference signal (CSI-RS).

27. The method of claim 17, wherein the indication is transmitted by the IAB node.

28. The method of claim 17, wherein the indication is transmitted by another IAB node serving the UE or the MT.

29. The method of claim 17, wherein the indication of the PCI change comprises the SSB configuration for the SSB carrying the new PCI value.

30. The method of claim 17, wherein the indication of the PCI change comprises QCL configuration for the QCL information.

31. An apparatus for wireless communication, comprising:
- a memory; and
- at least one processor coupled to the memory and configured to:
  - receive an indication of a physical cell identifier (PCI) change for a serving integrated access and backhaul (IAB) node, wherein the indication comprises at least one of a switch time for applying a new PCI value, a synchronization signal block (SSB) configuration for an SSB carrying the new PCI value, or a quasi-co-location (QCL) configuration for QCL information; and
  - use the new PCI value for receiving communication from the serving IAB node based on the indication of the PCI change.

32. The apparatus of claim 31, wherein the indication of the PCI change comprises the SSB configuration for the SSB carrying the new PCI value.

33. The apparatus of claim 31, wherein the indication of the PCI change comprises QCL configuration for the QCL information.

34. An apparatus for wireless communication, comprising:
- a memory; and
- at least one processor coupled to the memory and configured to:
  - determine a physical cell identifier (PCI) change for an integrated access and backhaul (IAB) node; and
  - transmit an indication of the PCI change to at least one user equipment (UE) or mobile termination (MT) of a child IAB node that is served by the IAB node, wherein the indication comprises at least one of a switch time for applying a new PCI value, a synchronization signal block (SSB) configuration for an SSB carrying the new PCI value, or a quasi-co-location (QCL) configuration for QCL information.

35. The apparatus of claim 34, wherein the indication of the PCI change comprises the SSB configuration for the SSB carrying the new PCI value.

36. The apparatus of claim 34, wherein the indication of the PCI change comprises QCL configuration for the QCL information.

\* \* \* \* \*